United States Patent

[11] 3,621,402

[72] Inventor William Allen Gardner
Sunderland, Mass.

[21] Appl. No. 60,558
[22] Filed Aug. 3, 1970
[45] Patented Nov. 16, 1971

[73] Assignee Bell Telephone Laboratories, Incorporated
Murray Hill, Berkeley Heights, N.J.

[54] SAMPLED DATA FILTER
9 Claims, 4 Drawing Figs.

[52] U.S. Cl. .......... 328/37, 328/167, 328/151, 307/221
[51] Int. Cl. .......... H03k 23/00
[50] Field of Search .......... 307/221, 238; 328/37, 151, 51, 122, 167

[56] References Cited

UNITED STATES PATENTS

| | | | |
|---|---|---|---|
| 3,252,009 | 5/1966 | Weimer | 328/37 |
| 3,289,010 | 11/1966 | Bacon et al. | 328/37 |
| 3,471,711 | 10/1969 | Poschenrieder et al. | 329/37 |
| 3,504,194 | 3/1970 | Eastman et al. | 328/151 |
| 3,537,019 | 10/1970 | Reichard | 328/151 |
| 3,539,928 | 11/1970 | Gardner et al. | 328/151 |
| 3,555,298 | 1/1971 | Neelands | 328/151 |

*Primary Examiner*—John S. Heyman
*Assistant Examiner*—R. E. Hart
*Attorneys*—R. J. Guenther and William L. Keefauver

ABSTRACT: A sampled data filter is disclosed comprising a plurality of amplifiers interconnected by delay units and feedback resistors. Each delay unit comprises the cascade connection of actuable switches and storage capacitors. The values of the capacitors and feedback resistors are preselected to obtain a desired transfer function and to nullify the effect of residual capacitor charge.

INVENTOR
W. A. GARDNER
BY Gerard E. Murphy
ATTORNEY

SAMPLED DATA FILTER

BACKGROUND OF THE INVENTION

1. Field of the Invention

This invention pertains to signal-filtering apparatus and, more particularly, to sampled data filters.

With the advent of large-scale integration (LSI), the search for universal basic filter system building blocks has been given great incentive. In particular, the development of integrable filters, i.e., filters which may be realized with integrated circuits, is presently receiving wide attention. Various approaches for realizing desired transfer functions are under investigation including RC (resistance-capacitance) active time invariant networks, RC networks with continuously varying resistances or capacitances, switched (N-path) RC filters and sampled data filters.

2. Description of the Prior Art

In classical communication engineering, highly frequency-selective circuits, such as filters, are constructed from resistors, capacitors, and inductors. While it is feasible and advantageous to develop resistor and capacitors in inexpensive microminiaturized thin film or solid-state form, the same is not true for inductors. Inductive elements are expensive, unacceptably large relative to the size of RC microminiaturized components and present problems because of their associated magnetic fields and because of their nonlinear behavior. Thus, an integrable filter must preferably be realized using only RC components.

It is a basic system engineering approach to attempt to realize an overall system transfer function by cascading simple lower order network sections. A basic building block such as a second-order filter may be combined with other such building blocks with several resulting advantages. Design procedure is simpler and sensitivity performance superior when a cascade configuration is used as compared to a direct realization of a filter as a single higher order section. A further consideration, when one considers basic building blocks for a system, is to attempt to realize the desired second-order filter with a minimum number of elements. Numerous prior art filters suffer from a surplusage of elements, thus increasing the cost of the basic building block and substantially increasing the cost of the resulting overall system filter.

It is therefore an object of this invention to realize an integrable second-order sampled data filter.

It is another object of this invention to realize a second-order sampled data filter which requires relatively few elements.

It is also another object of this invention to realize a universal sampled data filter which is capable of exhibiting a multiplicity of desired second-order transfer functions.

SUMMARY OF THE INVENTION

In accordance with the principles of this invention, these and other objects are accomplished by a sampled data filter comprising a plurality of amplifiers interconnected by delay units and feedback resistors. More particularly, each delay unit comprises the cascade connection of a first actuable switch, a first storage capacitor, a second actuable switch, a second storage capacitor, and a third actuable switch. The applied signal is sampled by the first switch, after amplification, and successively stored by the capacitors. The values of the capacitors and feedback resistors are preselected to obtain a desired transfer function and to nullify the effects of residual capacitor charge.

DETAILED DESCRIPTION OF THE INVENTION

Figure 1:
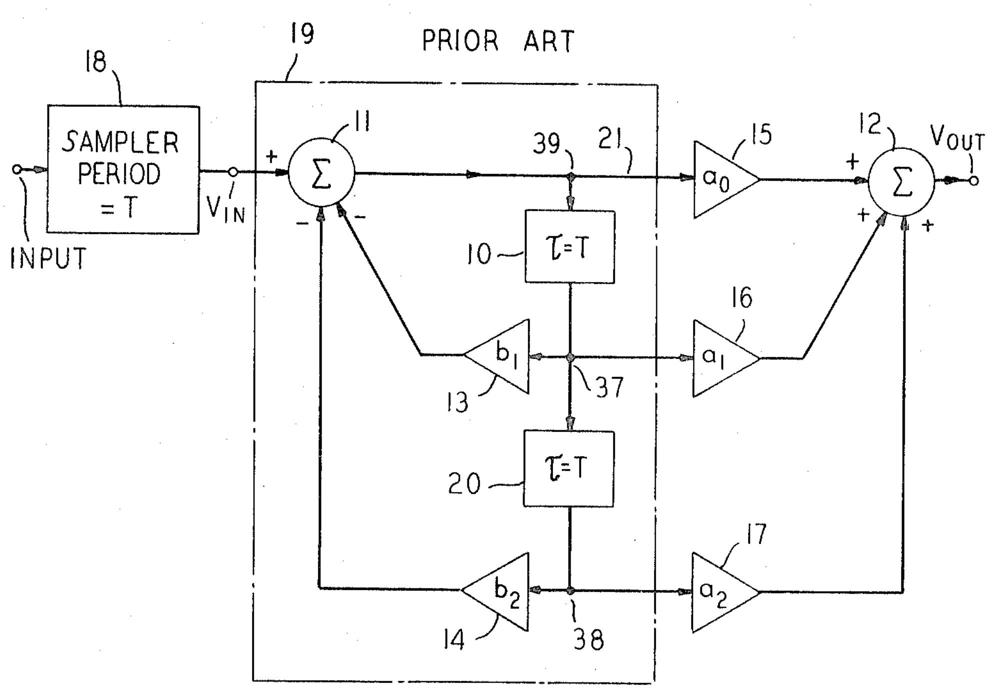
FIG. 1 is a block diagram of a prior art second-order sampled data filter.

A block diagram of a prior art second-order sampled data filter is shown in FIG. 1. An input signal, after being sampled by sampler 18 at a sampling frequency 1/T, is applied to summing network 11. Delay networks 10 and 20 sequentially delay the signal emanating from summing network 11 by intervals of delay $\tau$ equal to the sampling interval T. The coefficients of the filter transfer function, H(*s*), denominator are introduced by multiplier networks, i.e., amplifiers 13 and 14, which respectively multiply the signals emanating from delay units 10 and 20 by coefficients $b_1$ and $b_2$. These multiplied signals are algebraically combined with the sampler 18 output signal in summing network 11. The coefficients of the numerator of the filter transfer function are contributed by multiplier networks 15, 16, and 17, which multiply the various signals applied thereto by coefficients, respectively, of $a_0$, $a_1$, and $a_2$. These multiplied signals are summed in network 12 to develop the desired discrete-time, i.e., sampled data, filtered signal. An all-pole i.e., the numerator of H(*s*) equal to unity, filter section would comprise the elements enclosed by broken line block 19. A more detailed discussion of the operation of prior art filters may be found in the article entitled "Digital Filters," authored by J. F. Kaiser, pages 218 to 285, in *System Analysis by Digital Computer*, edited by Kuo and Kaiser, John Wiley and Sons, Inc., 1966.

The transfer function of a second-order filter, such as shown in FIG. 1, may be expressed as:

$$H(s)=\frac{V_{\text{out}}}{V_{\text{in}}}=\frac{a_0+a_1e^{-s\tau}+a_2e^{-2s\tau}}{1+b_1e^{-s\tau}+b_2e^{-2s\tau}} \quad (1)$$

It is generally desired that transfer function H(*s*) of a discrete-time filter approximate the transfer function H′(*s*) of a conventional analog filter which may be expressed as:

$$H'(s)=\frac{(s-a_n+jB_n)(s-a_n-jB_n)}{(s-a_d+jB_d)(s-a_d-jB_d)} \quad (2)$$

To determine the coefficients $b_1$ and $b_2$ of equation (1), e.g., the denominator of H(*s*) is set equal to zero and the roots ($a \pm jB$), i.e., the poles of the transfer function, are determined as functions of $b_1$, $b_2$, and $\tau$. Values for *a* and *B* are substituted from the desired pole locations of equation (2). Thus it may be shown that:

$$b_1=-2e^{a\tau}\cos(B\tau)$$
$$b_2=e^{2a\tau}. \quad (3)$$

In the interest of simplicity, it is convenient to first consider the desired transfer characteristic as an all-pole (no finite zeros) second-order filter. For this case, in equation (1), $a_0$ is set equal to unity and $a_1$ and $a_2$ are set equal to zero. Adder network 12 and amplifiers 15, 16, and 17 of FIG. 1 are therefore considered superfluous for the present purposes; the resulting all-pole filter is enclosed by broken line 19 of FIG. 1. Thus, the all-pole filter output signal is available on lead 21 of FIG. 1.

Figure 4:
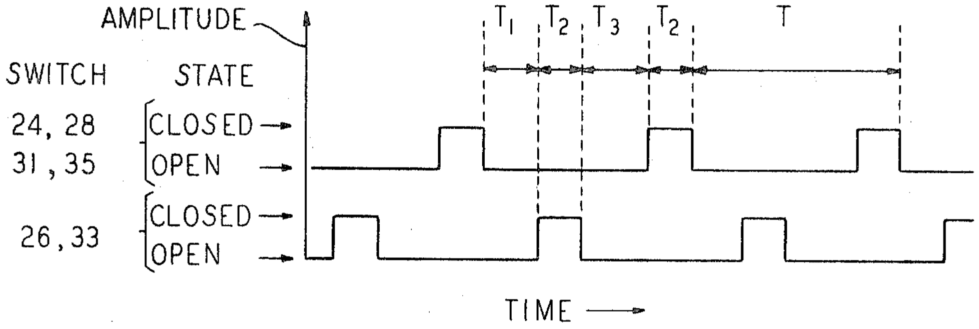
FIG. 4 depicts a timing diagram of the switching signals used in the filters of FIGS. 2 and 3.
Figure 2:
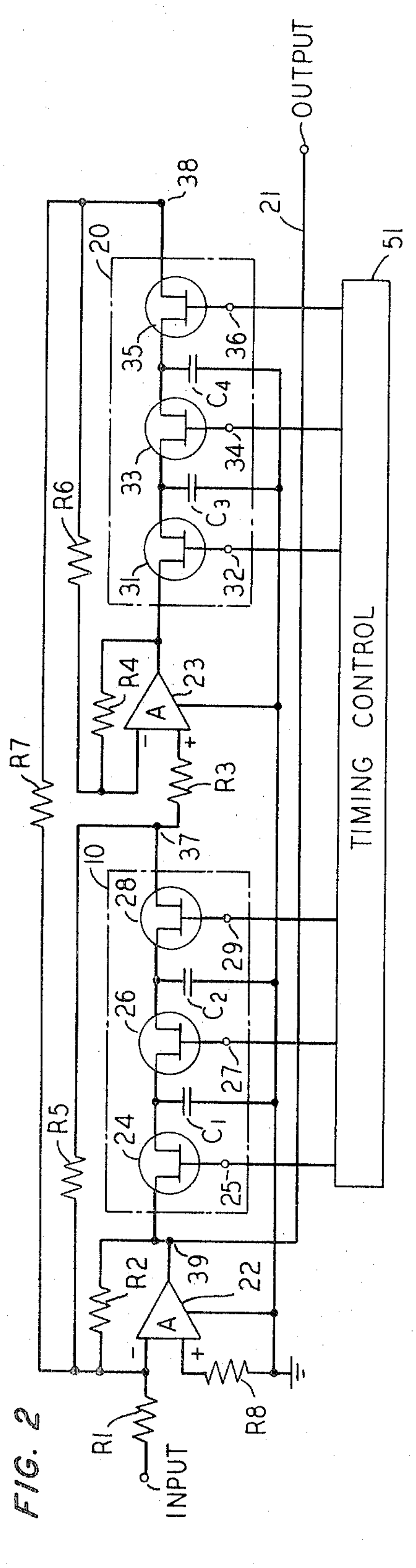
FIG. 2 illustrates an all-pole second-order RC sampled data filter in accordance with this invention.

FIG. 2 illustrates an active RC sampled data filter, in accordance with this invention, which exhibits an all-pole second-order transfer function. An input signal is applied, via resistor $R_1$, to operational amplifier 22. The signal is amplified and then sampled by switch 24. Switch 24 may be a field-effect transistor configuration or any other conventional switching circuit. Timing control signals, FIG. 4, applied to terminal 25 by apparatus 51 actuate switch 24, i.e., close switch 24 for an interval of time $T_2$, at the desired sampling intervals T. Switches 26, 28, 31, 33, and 35 may be identical to switch 24. The sampled signal is stored by capacitor $C_1$ for an interval of time $T_1$. Switch 26 is then operated in response to a signal applied to terminal 27, to transfer the sample stored by capacitor $C_1$ to capacitor $C_2$ during an interval of time $T_2$. After the elapse of a subsequent interval of time $T_3$, the delayed sample stored by capacitor $C_2$ is delivered, by activating switch 28, to terminal 37 while a new sample is being stored by capacitor $C_1$. Terminal 37 corresponds to the identically numbered terminal of FIG. 1. Switches 24, 26, and 28, in combination with capacitors $C_1$ and $C_2$, correspond to delay unit 10 of FIG. 1. A diagram depicting the timing control signals used for the switches of FIG. 2, and their relative duration, is shown in FIG. 4. Apparatus 51 for generating these timing signals is, of course, conventional.

The signal sample, delayed by an interval of time T, appearing at terminal 37 is applied via resistor $R_3$ to operational amplifier 23. In a manner identical to that described, the delayed sample is again delayed, for a second interval of time T, by delay unit 20 which comprises switches 31, 33, and 35 in combination with capacitors $C_3$ and $C_4$. The twice-delayed signal sample appears at terminal 38 which corresponds to terminal 38 of FIG. 1. Feedback resistors $R_2$, $R_5$, $R_4$, $R_6$, and $R_7$ in conjunction with amplifiers 22 and 23 provide the desired feedback coefficients $b_1$ and $b_2$ of equation (1).

Considering for illustrative purposes delay unit 10 of FIG. 2, amplifier 22 is effectively a voltage source having a minimal source impedance. Thus, the voltage to which capacitor $C_1$ is charged is not a function of any residual charge remaining on capacitor $C_1$ from the preceding stored sample. However, capacitor $C_2$ is charged by capacitor $C_1$ through switch 26 while both switches 24 and 28 are open. Thus, due to the principle of conservation of charge in a closed system, the final voltage to which capacitor $C_2$ is charged will be a function of the residual charge left on capacitor $C_2$ from the preceding stored sample. The net result is that the output sample is delayed relative to the input sample but is not proportional to the input sample. Of course, this same discrepancy occurs in delay unit 20 of FIG. 2.

By the practice of this invention, this error is corrected by employing negative feedback to cancel the residual charge left on capacitors $C_2$ and $C_4$ by each sample. This feedback, for the case of delay unit 10, is provided by resistor $R_5$ acting in conjunction with amplifier 22. Similarly, resistor $R_6$ and amplifier 23 provide the desired feedback for delay unit 20. If $R_5=R_2C_1/C_2$, then as each sample charges capacitor $C_1$, an additional charge equal but of opposite polarity to the residual charge left on capacitor $C_2$ is placed on capacitor $C_1$. Therefore, when switch 26 is closed and charge transferred from capacitor $C_1$ to capacitor $C_2$, the residual charge left on capacitor $C_2$ from the preceding sample is nullified. Similarly, if $R_6=R_4C_3/C_4$, residual charge left on capacitor $C_4$ from a previous stored sample is nullified. Amplifiers 22 and 23 not only serve as a feedback mechanism for the realization of coefficients $b_1$ and $b_2$, and the nullification of residual charge, but also, conveniently, serve as s summing amplifiers for the various delayed signal samples of the filter. In addition, they serve to provide an overall increase in amplitude of the filtered signal.

The coefficients $b_1$ and $b_2$ of equation (1) are given by $$b_1=\frac{\frac{R_2}{R_5}C_1-C_2}{C_1+C_2},\quad b_2=\frac{R_2}{R_7}\left(1+\frac{R_4}{R_6}\right)\left(\frac{C_1}{C_1+C_2}\right)\left(\frac{C_3}{C_3+C_4}\right) \tag{4}$$

where $R_4/R_6=C_4/C_3$.

The various charging and discharging time constants of the resistor-capacitor configurations of FIG. 2 satisfy the following requirements:

$$\tau_{C_1}=C_1R_{on}\leq T_2/3,$$

$$\tau_{C_3}=C_3R_{on}\leq T_2/3,$$

where $R_{on}$ is the "on resistance" of switches 24 and 31;

$$\tau_{C_2}=C_2R_5\geq 3T_2,$$

$$\tau_{C_4}=C_4\frac{R_6R_7}{R_6+R_7}\geq 3T_2;$$

$$\tau_{transfer_{10}}=R_{on}\frac{C_1C_2}{C_1+C_2}\leq T_2/3, \tag{5}$$

$$\tau_{transfer_{20}}=R_{on}\frac{C_3C_4}{C_3+C_4}\leq T_2/3,$$

where $R_{on}$ is the "on resistance" of switches 26 and 33; and $\tau_{holding}=\frac{1}{2}C_iR_{off}\geq 100\ T_1/X$, $i=1, 2, 3, 4$, where $X$ is the approximate percent error introduced by dissipation during each storage operation and $R_{off}$ is the "off resistance" of each switch. Furthermore, $T_2$, the duration of a timing control pulse, FIG. 4, should be approximately 10 times the switches speed, $T_s$, of switches 24, 26, 28, 31, and 35. It is apparent from FIG. 4 that the sum of $2T_2$, $T_1$, and $T_3$ must equal the sampling interval $T$ *and that* $T_2$ is preferably less than $T_1$ or $T_3$. Thus, $T$, the sampling interval should be greater than or equal to 40 times the switching speed, $T_s$.

Figure 3:
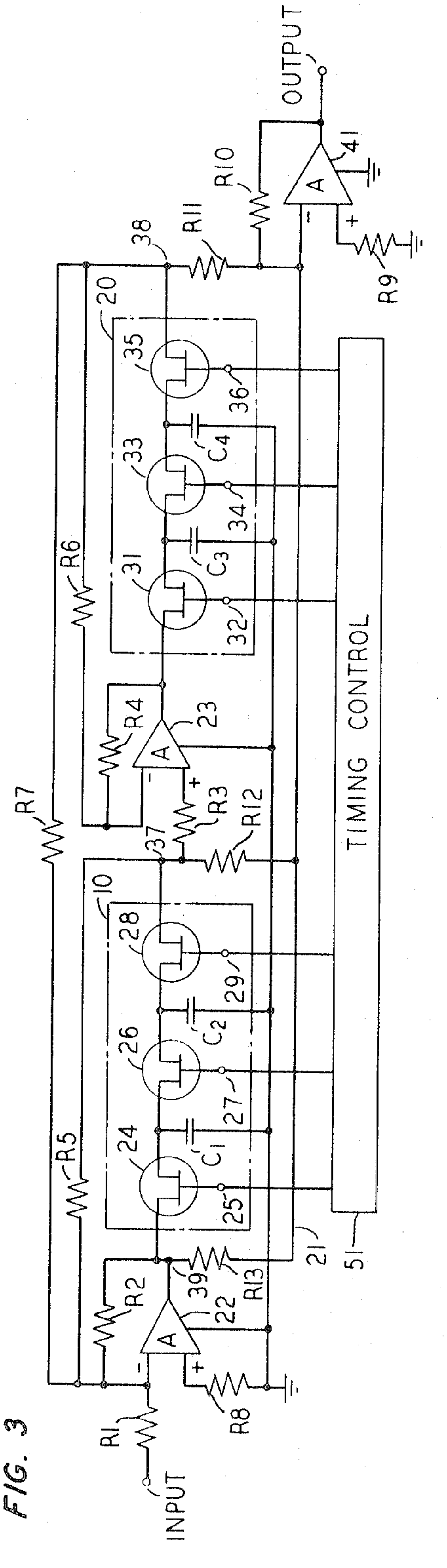
FIG. 3 depicts a universal second-order sampled data filter in accordance with this invention.

FIG. 3 depicts the second-order filter of FIG. 2 modified, in accordance with the practice of this invention, so as to introduce numerator coefficients $a_0$, $a_1$, and $a_2$, equation (1), into the overall transfer function of the filter. Thus, the circuit of FIG. 4 is a universal second-order sampled data filter which may realize any of a multiplicity of desired transfer functions. The various coefficients of the desired transfer function are easily selected simply by adjusting resistor and capacitor values. It is noted that the only additional circuitry required over and above that used in the all-pole filter of FIG. 2 is operational amplifier 41 and its associated resistors $R_{13}$, $R_{12}$, $R_{11}$, $R_{10}$, and $R_9$. Corresponding terminals appearing in FIGS. 1, 2, and 3 are identically numbered. The circuit operation is similar to that described above. However, the signals developed by amplifier 22 and delay units 10 and 20 are also applied to amplifier 41 to develop the desired output signal. The values of the coefficients of the transfer function are given by the following expressions:

$$b_1=\frac{\frac{R_2}{R_5}C_1-C_2}{C_1+C_1}$$

$$b_2=\left(\frac{R_2}{R_7}\right)\left(1+\frac{R_4}{R_6}\right)\left(\frac{C_1}{C_1+C_2}\right)\left(\frac{C_3}{C_3+C_4}\right)$$

$$a_0=\frac{R_2R_{10}}{R_1R_{13}} \tag{6}$$

$$a_1=\frac{R_2R_{10}}{R_1R_{12}}\left(\frac{C_1}{C_1+C_2}\right)$$

$$a_2=\frac{R_2R_{10}}{R_1R_{11}}\left(1+\frac{R_4}{R_6}\right)\left(\frac{C_1}{C_1+C_2}\right)\left(\frac{C_3}{C_3+C_4}\right)$$

The highest frequency, $f_o$, at which a pole can be realized by the filters under consideration can be obtained from the following relation:

$$f_o\leq\frac{1}{KT}\leq\frac{1}{40KT_s} \tag{7}$$

where $$K=2\pi\left[\cos^{-1}\left(\frac{-b_1}{\sqrt{b_2}}\right)\right]^{-1}$$

The factor $K$ determines the sensitivity of filter performance to the coefficients $B_1$ and $B_2$, and determines the precision of approximation of $H'(s)$ by $H(s)$, equations (1) and (2). The acceptable minimum value for $K$ is two, but for practical realizations $K$ should be between four and 20.

The following table presents the element values for an exemplary all-pole second-order filter, constructed in accordance with this invention, having a transfer function, $H(s)$, equation (1), which approximates the function given by:

$$H'(s)=\frac{1}{s^2+\frac{\omega_o}{Q}s+\omega_o^2} \tag{8}$$

where $Q=5$ and $\omega_o=2\pi\times10^5$ rad/sec.

The corresponding frequency response peaks at a frequency of $\omega_o/2\pi$ Hz. and has a 3db. bandwidth of $\omega_o/Q$, i.e., 20 percent. A K factor of four (which results in optimum sensitivity performance was used in this design, resulting in:

$$b_1=0,\ b_2=0.73041$$

$$T=2.5\ \mu\text{sec.} \tag{9}$$

A switching speed of $T_s\leq 62.5$ n.s. is required.

Table

| Element | Value |
|---|---|
| $C_1=C_2=C_3=C_4$ | 1,000.pf. |
| $R_1$ | 7.3 Kohms |
| $R_2$ | 7.3 Kohms |
| $R_3$ | 2.5 Kohms |
| $R_4$ | 5.0 Kohms |
| $R_5$ | 7.3 Kohms |
| $R_6$ | 5.0 Kohms |
| $R_7$ | 5.0 Kohms |
| $R_8$ | 1.6 Kohms |

What is claimed is:

1. A sampled data filter comprising:

a first amplifier responsive to an applied input signal;

first delay means, responsive to the output signal of said first amplifier, comprising a plurality of actuable switches connecting a plurality of storage capacitors;

a second amplifier responsive to the output signal of said first delay means;

second delay means, responsive to the output signal of said second amplifier, comprising a plurality of actuable switches connecting a plurality of storage capacitors;

first feedback means connecting the input and output of said first amplifier;

second feedback means connecting the input and of said second amplifier;

third feedback means connecting the output of said first delay means to the input of said first amplifier;

fourth feedback means connecting the output of said second delay means to the input of said second amplifier;

fifth feedback means connecting the output of said second delay means to the output of said first amplifier;

and means for selectively actuating the respective switches of said first and second delay means.

2. The sampled data filter of claim 1 further comprising:

a third amplifier responsive to the output signals of said first amplifier and said first and second delay means;

and sixth feedback means connecting the input and output of said third amplifier.

3. The sampled data filter of claim 1 further comprising:

a third amplifier;

first circuit means for applying the output signal of said first amplifier to said third amplifier;

second circuit means for applying the output signal of said first delay means to said third amplifier;

third circuit means for applying the output signal of said second delay means to said third amplifier;

and sixth feedback means connecting the input and of said third amplifier.

4. A sampled data filter comprising:

first amplifier means responsive to an applied input signal;

first delay means, responsive to the output signal of said first amplifier means, comprising a plurality of actuable switches connecting a plurality of storage capacitors;

first feedback means connecting the input and output of said first amplifier means;

second feedback means connecting the output of said first delay means to the input of said first amplifier means;

and control means for selectively actuating the respective switches of said delay means.

5. The sampled data filter of claim 4 further comprising:

second amplifier means responsive to the output of said first delay means;

second delay means, responsive to the output signal of said second amplifier means, comprising a plurality of actuable switches connecting a plurality of storage capacitors;

third feedback means connecting the input and output of said second amplifier means;

fourth feedback means connecting the output of said second delay means to the input of said second amplifier means;

fifth feedback means connecting the output of said second delay means to the input of said first amplifier means;

and means responsive to said control means for selectively actuating the respective switches of said second delay means.

6. The sampled data filter of claim 5 further comprising:

third amplifier means responsive to the output signals of said first amplifier means and said first and second delay means;

and sixth feedback means connecting the input and output of said third amplifier.

7. A sampled data filter comprising:

a first amplifier responsive to an applied input signal;

first delay means, responsive to the output signal of said first amplifier, comprising the serial connection of a first switch, a first capacitor, a second switch a second capacitor, and a third switch;

a second amplifier responsive to the output signal of said first delay means;

second delay means, responsive to the output signal of said second amplifier, comprising the serial connection of a first switch, a first capacitor, a second switch, a second capacitor and a third switch;

first resistor means connecting the input and of said first amplifier;

second resistor means connecting the input and output of said second amplifier;

third resistor means connecting the output of said first delay means to the input of said first amplifier;

fourth resistor means connecting the output of said second delay means to the input of said second amplifier;

fifth resistor means connecting the output of said second delay means to the input of said first amplifier;

and means for selectively operating the respective switches of said first and second delay means.

8. The sampled data filter of claim 7 further comprising:

a third amplifier responsive to the output signals of said first amplifier and said first and second delay means;

and sixth resistor means connecting the input and output of said third amplifier.

9. The sampled data filter of claim 7 further comprising:

a third amplifier;

sixth resistor means for applying the output signal of said first amplifier to said third amplifier;

seventh resistor means for applying the output signal of said first delay means to said third amplifier;

eighth resistor means for applying the output signal of said second delay means to said third amplifier;

and ninth resistor means connecting the input and output of said third amplifier.

* * * * *

UNITED STATES PATENT OFFICE
CERTIFICATE OF CORRECTION

Patent No. 3,621,402 Dated November 16, 1971

Inventor(s) William A. Gardner

It is certified that error appears in the above-identified patent and that said Letters Patent are hereby corrected as shown below:

Column 4, line 7, after "31," insert --33,--.

Column 4, line 58, insert a space between "K" and "is" in "Kis".

Column 4, line 72, after "performance" insert --)--.

Column 5, line 30, after "and" insert --output--.

Column 5, line 38, change "output" to --input--.

Column 5, line 54, after "and" insert --output--.

Column 6, line 37, after "and" insert --output--.

Signed and sealed this 6th day of June 1972.

(SEAL)
Attest:

EDWARD M.FLETCHER,JR.
Attesting Officer

ROBERT GOTTSCHALK
Commissioner of Patents